United States Patent
Gramckow et al.

[11] Patent Number: 5,966,682
[45] Date of Patent: Oct. 12, 1999

[54] SYSTEM FOR CALCULATING AN OUTPUT OF A MULTI-STAGE FORMING PROCESS

[75] Inventors: Otto Gramckow; Friedmann Schmid, both of Erlangen; Günter Sörgel, Nürnberg; Peter Protzel, Erlangen, all of Germany

[73] Assignee: Siemens AG, Munich, Germany

[21] Appl. No.: 08/953,309

[22] Filed: Oct. 17, 1997

[30]        Foreign Application Priority Data

Oct. 17, 1996 [DE]   Germany ........................... 196 42 918

[51] Int. Cl.$^6$ ........................................................ G06F 19/00
[52] U.S. Cl. ............... 702/170; 364/148.03; 364/472.12; 72/9.2
[58] Field of Search .................................... 702/170, 182; 364/148.01, 149, 150, 151, 152, 148.03, 148.02, 148.07, 472.13, 472.12; 29/527.7; 72/9.2, 10.4, 6.1, 6.2, 11.8, 9.1, 11.7

[56]          References Cited

U.S. PATENT DOCUMENTS

| 5,502,992 | 4/1996 | Sorgel et al. .................................. 72/8 |
| 5,513,097 | 4/1996 | Gramckow et al. ..................... 364/148 |
| 5,598,329 | 1/1997 | Niemann ................................ 364/150 |
| 5,600,758 | 2/1997 | Broese et al. .............................. 395/21 |
| 5,600,982 | 2/1997 | Berger ........................................ 72/9.2 |
| 5,608,842 | 3/1997 | Broese et al. ............................... 395/21 |
| 5,673,368 | 9/1997 | Broese et al. ............................... 395/22 |
| 5,680,784 | 10/1997 | Tateno et al. ............................... 72/8.7 |
| 5,740,686 | 4/1998 | Martinetz et al. .......................... 72/8.4 |
| 5,761,066 | 6/1998 | Lettau et al. ....................... 364/472.12 |

FOREIGN PATENT DOCUMENTS 2 354 649   11/1974   Germany.

OTHER PUBLICATIONS

T. Martinetz, et. al., "Neural Netowrks for Controlling Mill Trains", Automation Engineering Applications, R. Oldenbourg Verlag Publishers, vol. 38, No. 10, Oct. 1996, pp. 28–42.*

D. Lindhoff, et. al., "Experience with Neural Networks Used in Rolling Mill Automation", Steel and Iron, Oldenbourg, vol. 114, No. 4, Apr. 18, 1994, pp. 49–53.**

"High Accuracy and Rapid–Response–Hot Strip Mill", TECHNO Japan vol. 20, No. 9. Sep. 1987, pp. 54–59.

*Primary Examiner*—John Barlow
*Assistant Examiner*—Patrick Assouad
*Attorney, Agent, or Firm*—Kenyon & Kenyon

[57]             ABSTRACT

A system for calculating an output of a multi-stage forming process using a model of the forming process with which the output of the forming process is determined as a function of properties of the forming process. Selected properties of the forming process are determined using a neural network-based information processing arrangement.

30 Claims, 4 Drawing Sheets

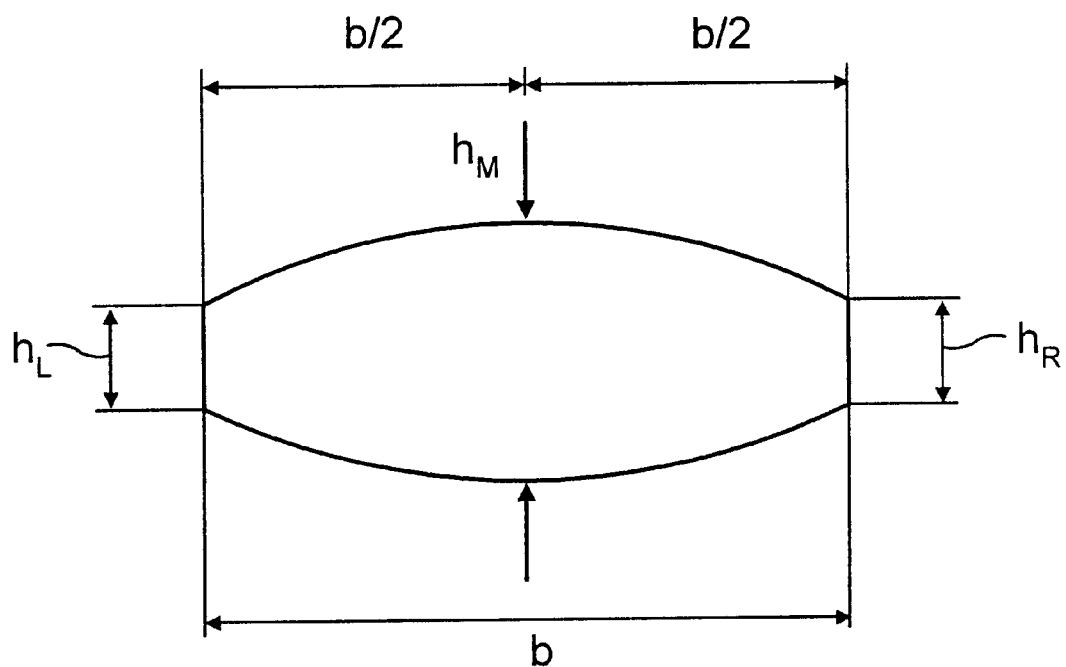
F I G. 1

SYSTEM FOR CALCULATING AN OUTPUT OF A MULTI-STAGE FORMING PROCESS

FIELD OF THE INVENTION

The present invention relates to a system for calculating an output of a multi-stage forming process. In particular, the present invention relates to a system for determining a final thickness profile of a rolled strip.

BACKGROUND OF THE INVENTION

To influence a final thickness profile of a rolled strip in a mill train having a plurality of roll stands, the influence on the thickness profile of the rolled strip must be distributed among several roll stands. For a suitable influence, values for the final thickness profile of the rolled strip after the individual roll stand must be available. Because it is difficult and expensive to measure the thickness profile of a rolled strip, the thickness profile of the rolled strip is usually measured at a single location. For example, the thickness profile of a rolled strip ($p_i$) downstream from the individual roll stands, and ultimately the final thickness profile, i.e., the thickness profile downstream from the final roll stand, can be determined by repeated use of the relationship:

$$p_i = k_i \cdot p_{i-1} \cdot \frac{h_i}{h_{i-1}} + (1 - k_i)\Pi_i \quad (1)$$

In equation (1), $k_i$ is calculated as follows:

$$k_i = \frac{1}{\pi}\arctan\left(\frac{c_{i1} - \ln x_i}{c_{i2}}\right) + \frac{1}{2} \quad (2)$$

where:

$$x_i = \frac{\sqrt{D_i * h_i^{1.5}}}{b^2} \quad (3)$$

Such calculations are discussed in "High-Accuracy and Rapid-Response Hot Strip Mill," TECHNO Japan, Vol. 20, No. 9, September 1987, pp. 54–59. In the above equations, $P_{i-1}$ is the thickness profile of the rolled strip upstream from the roll stand; $h_{i-1}$ is the strip thickness upstream from the roll stand; $h_i$ is the strip thickness downstream from the roll stand; $\pi_i$ is a load roll nip profile; $D_i$ is a working roll diameter; b is the thickness of the rolled strip; and $c_{i1}$ and $c_{i2}$ are model parameters. The factor $k_i$ is determined from analytical relationships, which take into account certain properties of the roll stand and the rolling stock.

A disadvantage of such a formulation is that the equations (2) and (3) are only approximately valid. Furthermore, the model parameters $c_{i1}$ and $c_{i2}$ are unknown and must be determined experimentally. This often leads to an inadequate determination of the thickness profile

SUMMARY OF THE INVENTION

The present invention is directed to a system that provides a more accurate determination of an output of a multi-stage forming process, in particular of a thickness profile and/or a final thickness profile of a rolled strip.

The system determines the thickness profile of a rolled strip downstream from a roll stand using a roll stand model. Using the roll stand model, the thickness profile of the rolled strip downstream from the roll stand is determined as a function of the thickness profile upstream from the roll stand and properties of the roll stand and/or properties of the roll stand taking into account properties of the rolled stock. The determination of selected properties of the roll stand and/or selected properties of the roll stand taking into account properties of the rolled stock is performed using neural network-based information processing.

The system of the present invention produces better results compared to conventional formulations where experimentally determined parameters are combined in analytical equations to form characteristic quantities that describe the properties of the roll stand and/or to describe the rolled stock. The system is especially suitable for determining the final thickness profile downstream from the roll stands of a multi-stage mill train with a high degree of precision.

It is advantageous to determine the thickness profile of a rolled strip downstream from a roll stand using the function $p_i=k_i \cdot p_{i-1} \cdot (h_i/h_{i-1})+(1-k_i)\pi_i$ and to determine the factor $k_i$ which represents properties of the roll stand and/or properties of the roll stand taking into account the properties of the rolled stock using neural network-based information processing. Determining the factor $k_i$ using neural network-based information processing is an advantage in comparison to conventional methods of determining the factor k.

In an exemplary embodiment of the present invention, the load roll nip profile is determined in a preliminary processing which may include a bending model, a roll temperature model, and a wear model. Existing algorithms for modeling the stress and temperature conditions prevailing in the roll stand, as well as aging, can still be used with the system of the present invention to determine the thickness profile of a rolled strip downstream from a roll stand. Continued use of conventional models for a mill train greatly reduces the cost of the system, and in particular permits retrofitting of existing roll stands and mill trains.

In another embodiment of the present invention, the neural network-based information processing that has been pretrained prior to start-up is trained on-line during operation. Such training makes it possible to adapt the system for determining the thickness profile of a rolled strip downstream from a roll stand to changes in the roll stand.

In another embodiment of the present invention, neural networks of the neural network-based information processing—particularly the neural networks in multiple-stand mill trains with further on-line training—have on-line training with respect to measured values for the final thickness profile exclusively with measured values after the last stand of the multiple-stand mill train. This makes it possible for the neural networks of all roll stands to continue on-line training without installing expensive equipment in the mill train for measuring the thickness profile. It is possible to conduct on-line training of the neural networks using only thickness profile measurement downstream from the last roll stand. Three training variants have proven advantageous for on-line training in particular. Thus, the neural networks are trained not only with data from the respective roll stands, but also with data from neighboring roll stands which is incorporated into the training with a lower weighting.

In alternative type of training, the neural networks of the neural network-based information processing have further on-line training with the same data for all the roll stands of the mill train. The result is that the neural networks for each roll stand are identical. Alternatively, the on-line training of the individual stand-specific networks is conducted only with data sets of the respective roll stand in such a way that only slight and/or well-defined differences are allowed for the weights of neighboring networks. The neural networks are trained so that the network parameters, i.e., the weighting or gain, of the neural network of an individual roll stand may not deviate from the corresponding network parameters of another roll stand by more than a certain tolerance value. According to this training strategy, the neural networks of the individual roll stands have the same structure. Due to the identity of structure, the individual network parameters of each roll stand are similar to the corresponding network parameters of the neural networks of the other stands. To ensure such similarity, the network parameters may not deviate by more than a certain tolerance value from the corresponding network parameters of the neural networks of the other roll stands. Different tolerance values can be established for different network parameters.

BRIEF DESCRIPTION OF THE DRAWINGS

FIG. 1 shows a cross section through a rolled strip.

DETAILED DESCRIPTION OF THE INVENTION

FIG. 1 shows a cross section through a rolled strip, where b is a width of the strip, $h_M$ is a thickness of the strip in the middle of the rolled strip, $h_L$ is a thickness of the strip at the left edge of the rolled strip and $h_R$ is a thickness of the strip at the right edge of the rolled strip.

A possible definition of a thickness profile p of the rolled strip is provided by the following function:

$$p = h_M - \frac{h_L + h_R}{2}$$

Figure 2:
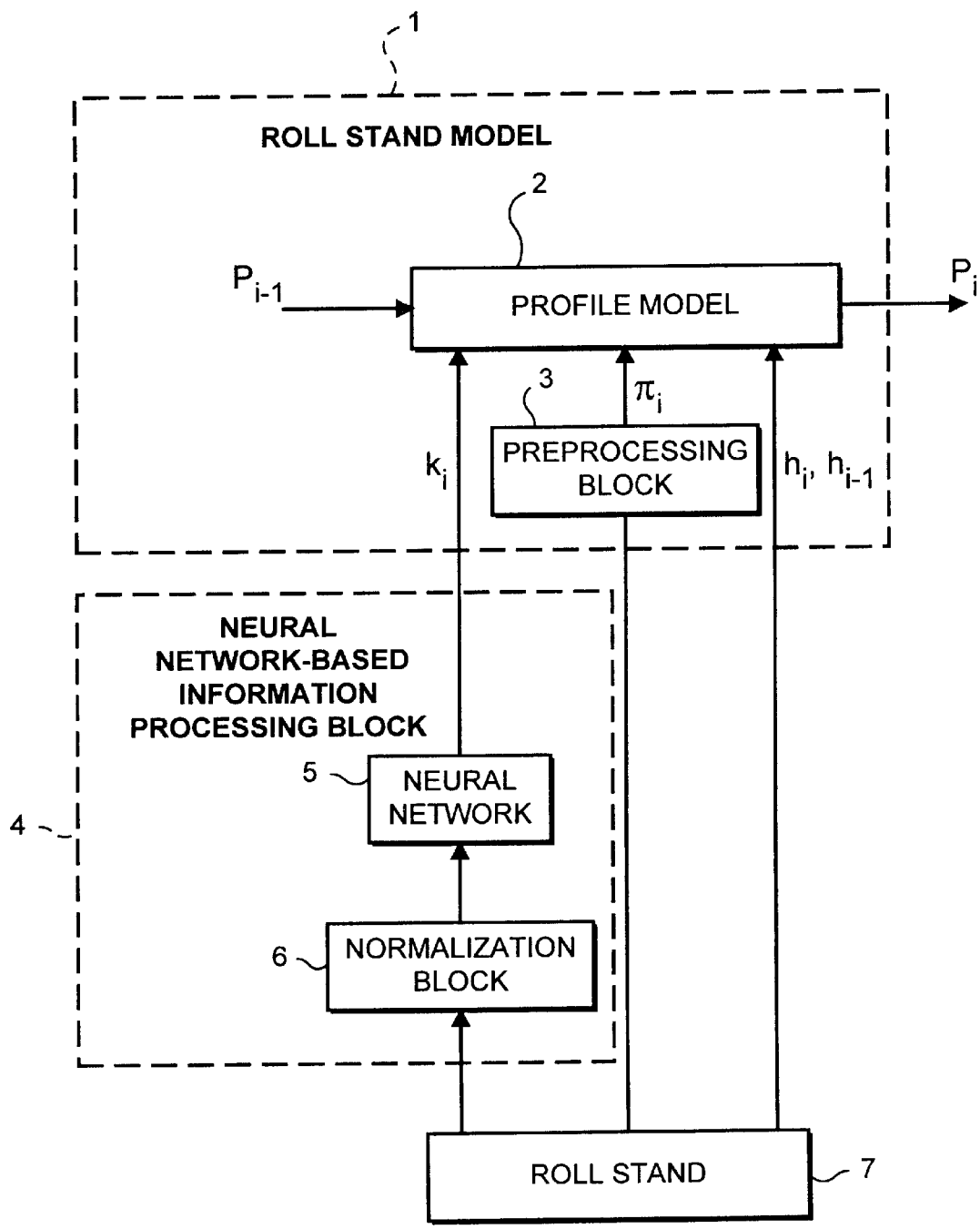
FIG. 2 shows an embodiment of a system according to the present invention for determining the thickness profile of a rolled strip.

FIG. 2 shows a functional block diagram of a system according to the present invention for determining the final thickness profile of a rolled strip. The system according to the present invention may be a one-chip computer or a multi-chip computer. The one-chip computer may include a microcontroller. The multi-chip computer may be a single-board computer or an automation device. The automation device may include a programmable controller, a VME bus or an industrial computer. FIG. 2 also shows a roll stand model 1 of a roll stand 7. The roll stand model 1 has a profile model 2 and a preprocessing block 3. The profile model 2 determines the thickness profile $p_i$ of a rolled strip downstream from the roll stand 7 as a function of the thickness profile $p_{i-1}$ upstream from the roll stand 7, a factor $k_i$ representing properties of the roll stand or properties of the roll stand taking into account properties of the rolled stock, of load roll nip profile $\pi_1$ which is calculated in the preprocessing block 3, and of the strip thicknesses $h_{i-1}$ and $h_i$ upstream and downstream from the roll stand 7. The factor $k_i$ is determined in a neural network-based information processing block 4 which includes a neural network 5 and a normalization block 6. The modular structure of the system, i.e., the separation into the roll stand model 1 and the neural network-based information processing block 4, makes it possible to reuse known algorithms for determining the thickness profile of a rolled strip downstream from a roll stand. The roll stand model 1 preferably contains the models and algorithms of known processes. However, the known determination of the factor $k_i$ is replaced by the neural network-based information processing block 4 of the system of the present invention. By using proven algorithms and models in the roll stand model 1, the neural network-based information processing block 4 can be made especially simple, because neither the profile model 1 nor the models such as a bending model, temperature model, or wear model need be learned, as is usually the case when calculating the load roll gap profile. The training for the neural network-based information processing 4 is strictly limited to the relationships between the roll stand and the rolled strip which are necessary to determine the factor $k_i$.

Figure 3:
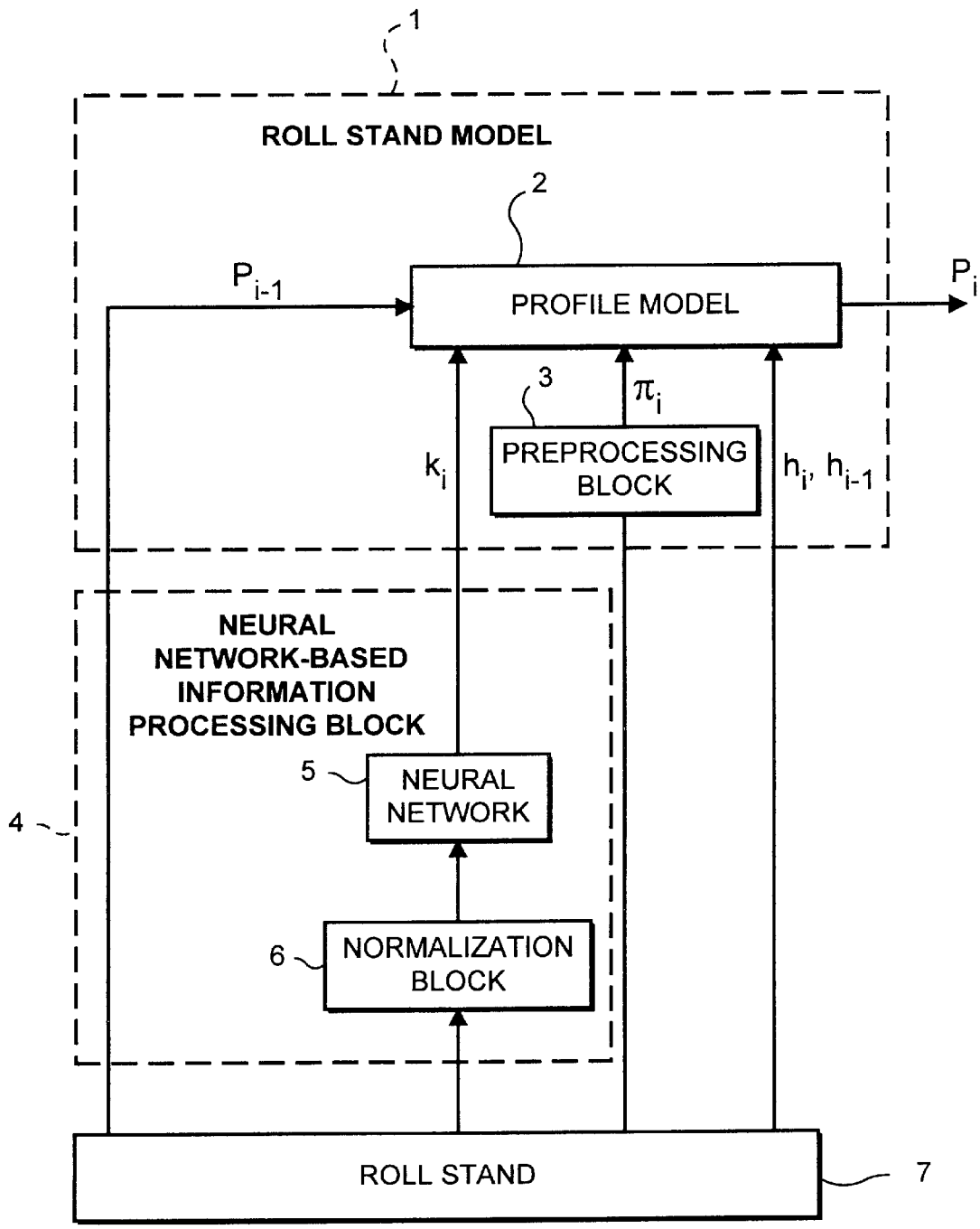
FIG. 3 shows another embodiment of a system for determining the thickness profile of a rolled strip.

The input variable to the profile model 1, the thickness profile $P_{i-1}$ upstream from the roll stand, may be either the output quantity of a profile model for an $(i-1)^{th}$ roll stand or a measured value. FIG. 3 shows the latter case.

Figure 4:
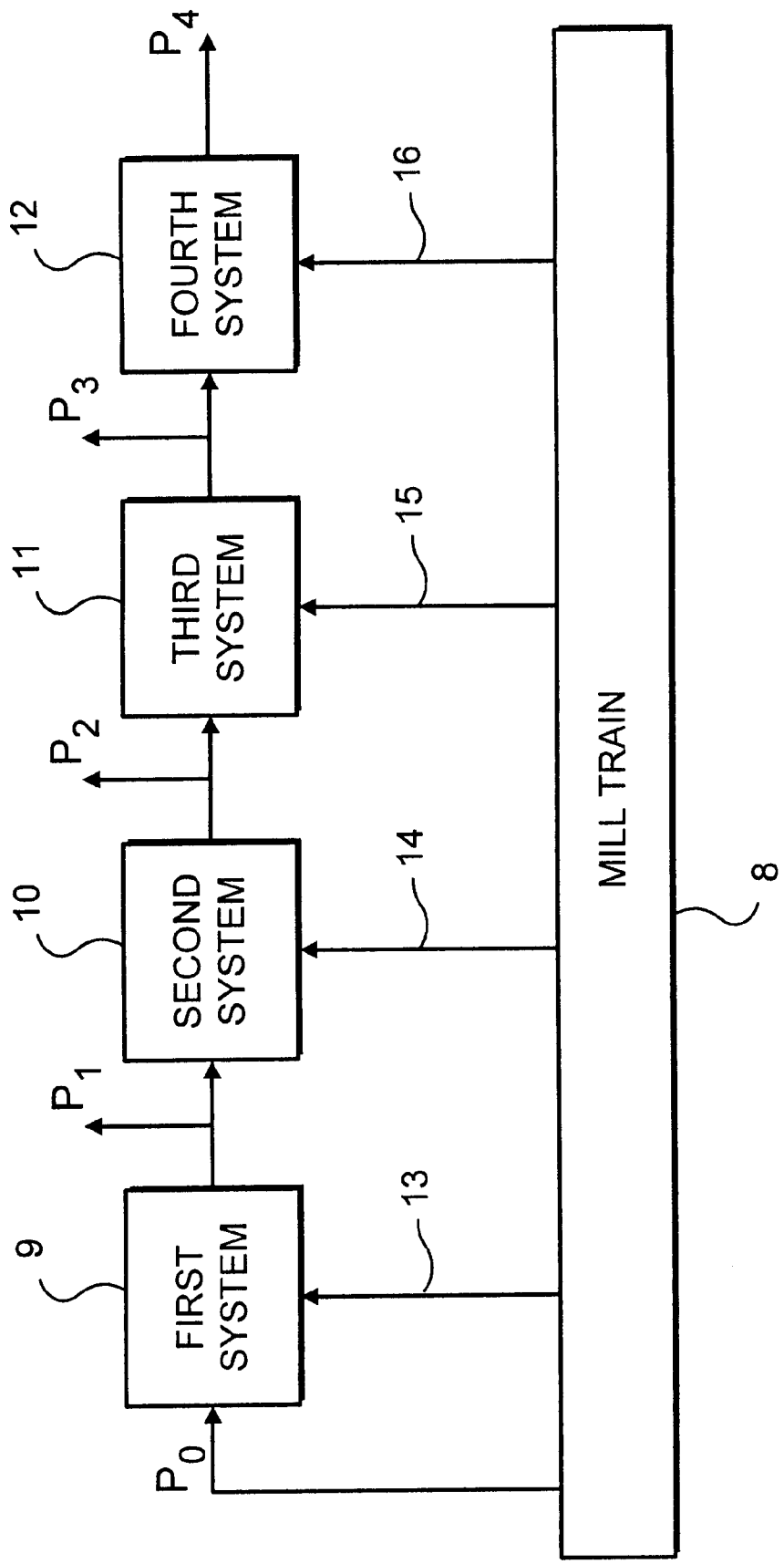
FIG. 4 shows an embodiment of a system for determining the thickness profile of a rolled strip in a mill train according to the present invention.

FIG. 4 shows a system for determining the final thickness profile of a rolled strip in a mill train 8. The mill train 8 has four roll stands. The system for determining the thickness profile of the mill train 8 has four systems 9, 10, 11 and 12, each one for determining the thickness profile of the rolled strip downstream from one roll stand. Measured values 13, 14, 15 and 16 are sent to each of the systems 9, 10, 11 and 12 and serve as input quantities to the neural network-based information processing, for the preprocessing, and for the profile model. A chemical composition of a rolled stock can also be such input quantity. A measured value of thickness profile $p_0$ of the rolled strip upstream from the first roll stand is also sent to the system for determining the thickness profile of the rolled strip downstream from the first roll stand. The system 10 for determining the thickness profile $p_2$ of the rolled strip downstream from the second roll stand determines the strip thickness profile $p_2$ as a function of measured values 14 and strip thickness profile $p_1$ which is determined as the output quantity of system 9 for determining the strip thickness profile $p_i$ of the rolled strip downstream from the first roll stand. Accordingly, each thickness profile $p_i$, $p_2$, and $p_3$, which is supplied by an upstream system 9, 10, and 11 for determining the thickness profile of the rolled strip downstream from a roll stand, is the input quantity of the downstream system 10, 11, 12 for determining the thickness profile of the rolled strip downstream from the respective roll stand.

What is claimed is:

1. A system for calculating an output of a multi-stage forming process, comprising:

a neural network-based information arrangement for determining properties of the multi-stage forming process;

a processing arrangement including a model of the multi-stage forming process for determining the output of the multi-stage forming process as a function of selected ones of the properties of the multi-stage forming process; and a roll stand model for determining a first thickness profile of a rolled strip downstream from a roll stand as a function of a second thickness profile upstream from the roll stand and as a function of at least one of the properties of the roll stand and of the rolled stock, wherein selected ones of the properties of the roll stand and of the rolled stock are determined using the neural network-based information arrangement, wherein the first thickness profile of the rolled strip downstream from a first roll stand is used as the second thickness profile of the rolled strip upstream from a second roll stand, the second roll stand following the first roll stand.

2. The system according to claim 1, wherein the thickness profile is determined using a function:

$$p_i = f_{pi}(p_{i-1}, h_{i-1}, h_i, k_i, \pi_i)$$

wherein, $p_{i-1}$ is the thickness profile upstream from the roll stand, $p_i$ is the thickness profile, $h_{i-1}$ is a strip thickness upstream from the roll stand, $h_i$ is a strip thickness downstream from the roll stand, $\pi_i$ is a load roll nip profile, and $k_i$ is a factor representing the properties of at least one of the roll stand and the rolled stock.

3. The system according to claim 2, wherein the thickness profile is determined using a function:

$$p_i = k_i \cdot p_{i-1} \cdot \frac{h_i}{h_{i-1}} + (1 - k_i)\Pi_i.$$

4. The system according to claim 2, wherein the factor k is determined using the neural network-based information arrangement.

5. The system according to claim 1, wherein an input quantity of the neural network-based information processing arrangement includes at least one of:
 a strip width upstream from the roll stand,
 a strip width downstream from the roll stand,
 a strip thickness upstream from the roll stand,
 a strip thickness downstream from the roll stand,
 a reduction in strip thickness,
 a front tension upstream from the roll stand,
 a front tension downstream from the roll stand,
 a rolling force,
 a bending force,
 a working roll diameter,
 a duration of a pause between two strips, and
 a chemical composition of the rolled stock.

6. The system according to claim 2, wherein input quantities of the neural network-based information arrangement include:
 at least one of a strip width upstream from the roll stand and a strip width downstream from the roll stand,
 at least one of a strip thickness upstream from the roll stand and a strip thickness downstream from the roll stand,
 a reduction in a strip thickness,
 at least one of a strip tension upstream from the roll stand and a strip tension downstream from the roll stand, a rolling force,
 a bending force,
 a working roll diameter,
 a duration of a pause between two strips, and
 a chemical composition of the rolled stock.

7. The system according to claim 2, wherein input quantities of the neural network-based information arrangement include:
 at least one of a strip width upstream from the roll stand and a strip width downstream from the roll stand; and
 at least one of a strip thickness upstream from the roll stand and a strip thickness downstream from the roll stand.

8. The system according to claims 2, wherein input quantities of the neural network-based information arrangement are normalized.

9. The system according to claim 8, wherein each input quantity to the neural network-based information arrangement is normalized in relation to a range of the input quantity.

10. The system according to claim 3, wherein the load roll nip profile is determined in a preprocessing.

11. The system according to claim 10, wherein the preprocessing includes:
 a bending model;
 a roll temperature model; and
 a wear model.

12. The system according to claim 11, wherein the bending, roll temperature and wear models include analytical models.

13. The system according to claim 11, wherein the bending, roll temperature and wear models include neural networks.

14. The system according to claim 11, wherein the bending, roll temperature and wear models include analytical models and neural networks.

15. The system according to claim 2, wherein the neural network-based information arrangement includes neural networks which are trained.

16. The system according to claim 15, wherein the neural networks are trained on-line.

17. The system according to claim 2, wherein in multiple-stand mill trains, the neural network-based information arrangement includes neural networks which are trained as a function of values of the strip thickness profile measured downstream from a final roll stand of the multiple-stand mill train.

18. The system according to claim 17, wherein neural networks associated with a corresponding roll stand are trained with data from other stands incorporated into the training of the neural networks with a lower weighting.

19. The system according to claim 18, wherein the other stands include stands directly adjacent to the corresponding roll stand.

20. The system according to claim 17, wherein the neural networks are associated with corresponding rolling stands of the multiple-stand mill train and wherein the neural networks are similar.

21. The system according to claim 17, wherein the neural networks are trained exclusively with data sets from a corresponding roll stand as part of the on-line training.

22. The system according to claim 2, wherein the neural network-based information arrangement includes neural networks that are trained so that network parameters of a first neural network associated with a first roll stand do not deviate from corresponding network parameters of a second neural network associated with a second roll stand by more than a predetermined tolerance value.

23. The system according to claim 2, wherein the system is part of an automatic process control system for a rolling installation.

24. The system according to claim 2, wherein the system comprises a process computer.

25. The system according to claim 24, wherein the process computer includes one of a one-chip computer and a multi-chip computer.

26. The system according to claim 25, wherein the one-chip computer is a microcontroller.

27. The system according to claim 25, wherein the multi-chip computer includes one of a single-board computer and an automation device.

28. The system according to claim 27, wherein the automation device includes one of a programmable controller, a VME bus system, and an industrial computer.

29. A process for determining a first thickness profile of a rolled strip downstream from a roll stand, comprising the steps of:

determining selected properties of at least one of the roll stand and the rolled strip using a neural network-based information processing arrangement; and using a roll stand model to determine the first thickness profile as a function of a second thickness profile upstream from the roll stand and as a function of the selected properties, the selected properties being at least one of the properties of the roll stand and of the rolled stock, wherein selected ones of the properties of the roll stand and of the rolled stock are determined using the neural network-based information arrangement, wherein the first thickness profile of the rolled strip downstream from a first roll stand is used as the second thickness profile of the rolled strip upstream from a second roll stand, the second roll stand following the first roll stand.

30. The process according to claim 29 wherein the rolled strip includes steel.

* * * * *